(12) United States Patent
Chatani

(10) Patent No.: US 10,061,902 B2
(45) Date of Patent: Aug. 28, 2018

(54) METHOD, MEDIUM, AND SYSTEM FOR MANAGING TRANSFER OF CONTENT

(75) Inventor: Masayuki Chatani, Sunnyvale, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 0 days.

(21) Appl. No.: 12/011,903

(22) Filed: Jan. 29, 2008

(65) Prior Publication Data

US 2008/0126223 A1    May 29, 2008

Related U.S. Application Data

(62) Division of application No. 09/894,793, filed on Jun. 28, 2001.

(Continued)

(51) Int. Cl.
*G06Q 30/00* (2012.01)
*G06F 21/10* (2013.01)
(Continued)

(52) U.S. Cl.
CPC .............. *G06F 21/10* (2013.01); *G06F 21/78* (2013.01); *G06Q 20/10* (2013.01);
(Continued)

(58) Field of Classification Search
CPC .... G06Q 30/06; G06Q 30/08; G06Q 20/1235; G06Q 20/10; G06Q 30/0601;
(Continued)

(56) References Cited

U.S. PATENT DOCUMENTS

| 5,222,134 A | 6/1993 | Waite et al. |
| 5,233,423 A | 8/1993 | Jernigan et al. |

(Continued)

FOREIGN PATENT DOCUMENTS

| EP | 0 773 490 A1 | 5/1997 |
| EP | 0 795 809 | 9/1997 |

(Continued)

OTHER PUBLICATIONS

Digital Music Industry Leaders Line Up to Support iPIN's E-Content Payment System PR Newswire [New York] Sep. 20, 1999: 1. Downloaded from ProQuestDirect on the Internet on Sep. 27, 2016, 4 pages.*

(Continued)

*Primary Examiner* — Matthew E Zimmerman
(74) *Attorney, Agent, or Firm* — Polsinelli LLP

(57) ABSTRACT

A system and method for transferring ownership of disc storage media utilizing unique disc identification includes a disc storage medium with a permanently recorded disc identification, a user console with a set identification, a network, and a host server managing a user database and a disc database. Upon purchase of software stored on a disc storage medium, the unique disc identification and user identification are transmitted over the network from the user console to the host server. The host server grants the user console access permission to the programs residing on the disc storage medium and performs the disc ownership transfer transactions.

16 Claims, 5 Drawing Sheets

Related U.S. Application Data

(60) Provisional application No. 60/270,232, filed on Feb. 20, 2001.

(51) Int. Cl.
*G06F 21/78* (2013.01)
*G06Q 20/10* (2012.01)
*G06Q 20/12* (2012.01)
*G06Q 30/06* (2012.01)

(52) U.S. Cl.
CPC ......... *G06Q 20/1235* (2013.01); *G06Q 30/06* (2013.01); *G06Q 30/0601* (2013.01); *G06Q 30/0635* (2013.01); *G06F 2221/0773* (2013.01); *G06F 2221/0797* (2013.01)

(58) Field of Classification Search
CPC ..... G06Q 30/0635; G06F 21/10; G06F 21/78; G06F 2221/0773; G06F 2221/0797
USPC .......................... 705/26, 37, 26.1, 37.1, 27.1
See application file for complete search history.

(56) References Cited

U.S. PATENT DOCUMENTS

| | | |
|---|---|---|
| 5,490,216 A | 2/1996 | Richardson, III |
| 5,523,551 A | 6/1996 | Scott |
| 5,532,735 A | 7/1996 | Blahut et al. |
| 5,629,980 A | 5/1997 | Stefik et al. |
| 5,636,277 A | 6/1997 | Nagahama |
| 5,794,217 A | 8/1998 | Allen |
| 5,809,145 A | 9/1998 | Slik et al. |
| 5,838,314 A | 11/1998 | Neel et al. |
| 5,845,265 A | 12/1998 | Woolston |
| 5,892,900 A | 4/1999 | Ginter et al. |
| 5,913,040 A | 6/1999 | Rakavy et al. |
| 6,066,182 A | 5/2000 | Wilde et al. |
| 6,070,141 A | 5/2000 | Houvener et al. |
| 6,073,123 A | 6/2000 | Staley |
| 6,081,785 A | 6/2000 | Oshima et al. |
| 6,085,176 A | 7/2000 | Woolston |
| 6,085,262 A | 7/2000 | Sawada |
| 6,117,011 A | 9/2000 | Lvov |
| 6,119,108 A | 9/2000 | Holmes et al. |
| 6,135,646 A * | 10/2000 | Kahn ............... G06F 21/10 707/999.104 |
| 6,137,480 A | 10/2000 | Shintani |
| 6,148,335 A | 11/2000 | Haggard et al. |
| 6,189,146 B1 | 2/2001 | Misra et al. |
| 6,195,432 B1 | 2/2001 | Takahashi et al. |
| 6,201,771 B1 | 3/2001 | Otsuka et al. |
| 6,202,051 B1 | 3/2001 | Woolston |
| 6,243,796 B1 | 6/2001 | Otsuka |
| 6,247,131 B1 | 6/2001 | Kotani et al. |
| 6,260,141 B1 | 7/2001 | Park |
| 6,266,651 B1 | 7/2001 | Woolston |
| 6,311,209 B1 | 10/2001 | Olson et al. |
| 6,314,451 B1 | 11/2001 | Landsman et al. |
| 6,405,203 B1 * | 6/2002 | Collart ................ G06K 17/00 382/205 |
| 6,434,535 B1 | 8/2002 | Kupka et al. |
| 6,446,260 B1 | 9/2002 | Wilde et al. |
| 6,463,078 B1 | 10/2002 | Engstrom et al. |
| 6,470,085 B1 | 10/2002 | Uranaka et al. |
| 6,529,453 B1 | 3/2003 | Otsuka et al. |
| 6,560,640 B2 | 5/2003 | Smethers |
| 6,594,740 B1 | 7/2003 | Fukuda |
| 6,611,607 B1 | 8/2003 | Davis et al. |
| 6,633,849 B1 | 10/2003 | Dodd |
| 6,640,306 B1 * | 10/2003 | Tone ................ H04L 29/06027 726/26 |
| 6,655,580 B1 | 12/2003 | Ergo |
| 6,694,025 B1 | 2/2004 | Epstein et al. |
| 6,820,063 B1 | 11/2004 | England et al. |
| 6,832,318 B1 | 12/2004 | Yaegashi et al. |
| 6,920,565 B2 | 7/2005 | Isaacson et al. |
| 7,313,251 B2 | 12/2007 | Rhoads |
| 7,426,750 B2 | 9/2008 | Cooper |
| 7,480,621 B1 | 1/2009 | Megiddo |
| 7,515,733 B2 | 4/2009 | Rhoads |
| 7,571,328 B2 | 8/2009 | Baumert |
| 7,613,633 B1 | 11/2009 | Woolston |
| 7,613,735 B2 | 11/2009 | Yao |
| 7,845,002 B1 | 11/2010 | Boyer et al. |
| 8,073,740 B1 | 12/2011 | Siegel et al. |
| 8,190,519 B1 | 5/2012 | Angilivelil et al. |
| 9,275,197 B2 | 3/2016 | Harris |
| 2001/0007981 A1 | 7/2001 | Woolston |
| 2001/0020295 A1 | 9/2001 | Satoh |
| 2001/0025256 A1 | 9/2001 | Oliphant et al. |
| 2001/0034721 A1 | 10/2001 | Bourdeau et al. |
| 2001/0042021 A1 | 11/2001 | Matsuo et al. |
| 2001/0051996 A1 | 12/2001 | Cooper et al. |
| 2002/0016922 A1 | 2/2002 | Richards et al. |
| 2002/0029252 A1 | 3/2002 | Segan et al. |
| 2002/0052816 A1 | 5/2002 | Clenaghan et al. |
| 2002/0077988 A1 | 6/2002 | Sasaki et al. |
| 2002/0082997 A1 | 6/2002 | Kobata et al. |
| 2002/0116283 A1 | 6/2002 | Chatani |
| 2002/0103855 A1 | 8/2002 | Chatani |
| 2002/0104019 A1 | 8/2002 | Chatani et al. |
| 2002/0116206 A1 | 8/2002 | Chatani |
| 2002/0116275 A1 | 8/2002 | Woolston |
| 2002/0129094 A1 | 9/2002 | Reisman |
| 2002/0161709 A1 | 10/2002 | Floyd et al. |
| 2002/0196940 A1 | 12/2002 | Isaacson et al. |
| 2003/0032486 A1 | 2/2003 | Elliott et al. |
| 2004/0133512 A1 | 7/2004 | Woolston |
| 2004/0205028 A1 | 10/2004 | Verosub |
| 2004/0220878 A1 | 11/2004 | Lao et al. |
| 2005/0033655 A1 | 2/2005 | Woolston |
| 2005/0049929 A1 | 3/2005 | Hsu et al. |
| 2005/0204405 A1 | 9/2005 | Wormington |
| 2005/0216548 A1 | 9/2005 | Wormington et al. |
| 2005/0261988 A1 | 11/2005 | Horel |
| 2006/0253399 A1 | 11/2006 | Chatani |
| 2007/0088622 A1 | 4/2007 | Floyd |
| 2007/0174385 A1 | 7/2007 | DuFour |
| 2007/0207780 A1 | 9/2007 | McLean |
| 2007/0271184 A1 | 11/2007 | Niebert |
| 2007/0271188 A1 | 11/2007 | Burkholder |
| 2007/0282850 A1 | 12/2007 | Sachnoff |
| 2008/0082405 A1 | 4/2008 | Martinez |
| 2008/0120196 A1 | 5/2008 | Reed |
| 2008/0154898 A1 | 6/2008 | Cheng |
| 2008/0167994 A1 | 7/2008 | Li et al. |
| 2008/0189188 A1 | 8/2008 | Morgenstern |
| 2008/0244038 A1 | 10/2008 | Martinez |
| 2008/0256592 A1 | 10/2008 | Schnell et al. |
| 2008/0313040 A1 | 12/2008 | Rose |
| 2009/0006225 A1 | 1/2009 | Multerer |
| 2009/0055288 A1 | 2/2009 | Nassimi |
| 2009/0083281 A1 | 3/2009 | Sarig et al. |
| 2009/0083541 A1 | 3/2009 | Levine |
| 2009/0234755 A1 | 9/2009 | Sidoruk |
| 2009/0327121 A1 | 12/2009 | Carroll et al. |
| 2010/0082489 A1 | 4/2010 | Lin et al. |
| 2010/0280879 A1 | 11/2010 | O'Sullivan et al. |
| 2010/0299151 A1 | 11/2010 | Soroka et al. |
| 2010/0306038 A1 | 12/2010 | Harris |
| 2011/0016182 A1 | 1/2011 | Harris |
| 2011/0314560 A1 | 12/2011 | Harris |
| 2012/0330790 A1 | 12/2012 | Chatani |

FOREIGN PATENT DOCUMENTS

| | | |
|---|---|---|
| EP | 1 016 960 A1 | 7/2000 |
| JP | 9 244886 | 9/1997 |
| JP | 10-069511 | 3/1998 |
| JP | 10-133955 | 5/1998 |
| JP | 10-222428 | 8/1998 |
| JP | 11-143719 | 5/1999 |
| JP | 2000-020795 | 1/2000 |
| JP | 2000-227919 | 8/2000 |

(56) References Cited

FOREIGN PATENT DOCUMENTS

| | | |
|---|---|---|
| JP | 2000-298689 | 10/2000 |
| JP | 02001169246 | 6/2001 |
| KR | 1998-030143 | 7/1998 |
| KR | 1998-033266 | 7/1998 |
| KR | 2000-0060715 | 10/2000 |
| WO | WO9634356 | 10/1996 |
| WO | WO 00/63860 | 10/2000 |
| WO | WO 02/001333 A3 | 1/2002 |
| WO | WO 2002/067095 | 8/2002 |
| WO | WO 2011/011030 | 1/2011 |

OTHER PUBLICATIONS

Bidwell, Percy W, Imports in the American Economy, Foreign Affairs (pre-1986); Oct. 1945; 24, 000001; ProQuest Central, pp. 85-98, total 14 pages.*
Classified ad 4—no title (May 29, 1852. New York Daily Times (1851-1857).*
Martin, Thomas, Ancient Greece: from prehistoric to Hellenistic Times, Yale University, 1996. pp. 11-12, total 2 pages.*
Digital Music Industry Leaders Line Up to Support iPIN's E-Content Payment System PR Newswire [New York] Sep. 20, 1999 (Year: 1999).*
Alice Atkinson-Bonasio, Video Game Tips: How to use save points effectively published Oct. 12, 2008, www.Helium.com http://www.helium.com/items/1205745-save-feature-and-the-gaming-community pp. 1-3 retrieved Jul. 19, 2011. document titled save points on Heliump1-3.pdf.
PCT/US02/05422 International Search Report dated Sep. 12, 2002.
PCT/US10/00205 International Search Report and Written Opinion dated Mar. 12, 2010.
U.S. Appl. No. 09/894,793 Final Office Action dated Jan. 6, 2009.
U.S. Appl. No. 09/894,793 Final Office Action dated Nov. 20, 2007.
U.S. Appl. No. 09/894,793 Final Office Action dated Jan. 4, 2007.
U.S. Appl. No. 09/894,793 Office Action dated Aug. 7, 2006.
U.S. Appl. No. 09/894,793 Final Office Action dated Feb. 7, 2006.
U.S. Appl. No. 09/894,793 Office Action dated Aug. 23, 2005.
U.S. Appl. No. 09/894,793 Final Office Action dated Apr. 4, 2005.
U.S. Appl. No. 09/894,793 Office Action dated Aug. 18, 2004.
U.S. Appl. No. 13/529,669 Final Office Action dated Oct. 25, 2013.
U.S. Appl. No. 13/529,669 Office Action dated Mar. 28, 2013.
U.S. Appl. No. 12/473,668 Final Office Action dated Jan. 19, 2012.
U.S. Appl. No. 12/473,668 Office Action dated Aug. 2, 2011.
U.S. Appl. No. 12/506,076 Final Office Action dated Oct. 9, 2013.
U.S. Appl. No. 12/506,076 Office Action dated Oct. 5, 2012.
U.S. Appl. No. 12/220,157 Final Office Action dated Jun. 21, 2013.
U.S. Appl. No. 12/220,157 Office Action dated Mar. 6, 2013.
U.S. Appl. No. 13/529,669 Final Office Action dated Jun. 23, 2014.
U.S. Appl. No. 13/220,157 Office Action dated Aug. 7, 2014.
U.S. Appl. No. 13/220,157 Final Office Action dated Jun. 21, 2013.
U.S. Appl. No. 13/220,157 Office Action dated Mar. 6, 2013.
U.S. Appl. No. 12/473,668 Office Action dated Feb. 11, 2016.
U.S. Appl. No. 12/506,076 Office Action dated Jun. 17, 2016.
U.S. Appl. No. 12/506,076 Office Action dated Feb. 25, 2016.
Merriam-Webster Online, Definition of "privilege", Apr. 25, 2009.
U.S. Appl. No. 13/220,157 Office Action dated Jul. 30, 2015.
U.S. Appl. No. 13/529,669 Final Office Action dated Jan. 22, 2015.
U.S. Appl. No. 13/529,669 Office Action dated Nov. 18, 2016.
Kuchera, Ben; "Nintendo's Wii Speak a new front in a war against used games", Nov. 13, 2008 7:30pm, ARS technica, retrieved from http://arstechnica.com/gaming/2008/11/nintendos-wii-speak-a-new-front-in-war-against-used-games/ on Jan. 2, 2017 saved as (Nintendo Wii Speak a new front in war against used games.pdf).
Stuart, Keith; "Michael Capps—Part Two 'Epic's president offers his views on retail vs. digital distribution argument . . . ", Nov. 10, 2008 Gamesindustry.biz, retrieved from http://www.gamesindustry.biz/articles/michael-capps-part-two on Jan. 2, 2017 saved as (michael-capps-part-two.pdf).
U.S. Appl. No. 12/473,668 Final Office Action dated Jan. 10, 2017.
U.S. Appl. No. 12/473,668 Final Office Action dated Jan. 30, 2018.
Bendel, Mike; "Epic: Used Game Market is a huge issue, Publishers Exploring Ways to Combat", Nov. 10, 2008, https://www.exophase.com/8895/epic-used-game-market-is-a-huge-issue-publishers-exploring-ways-to-combat/.
U.S. Appl. No. 12/473,668 Office Action dated May 22, 2017.

\* cited by examiner

Disc Storage
Medium

METHOD, MEDIUM, AND SYSTEM FOR MANAGING TRANSFER OF CONTENT

CROSS REFERENCE TO RELATED APPLICATIONS

This application is a divisional and claims the priority benefit of U.S. patent application Ser. No. 09/894,793 entitled "System and Method for Transfer of Disc Ownership Based on Disc and User Identification" filed Jun. 28, 2001, which claims the priority benefit of U.S. provisional patent application No. 60/270,232 entitled "System and Method for Transfer of Disc Ownership Based on Disc and User Identification," filed Feb. 20, 2001.

This application is related to U.S. patent application Ser. No. 09/894,182 and now U.S. Pat. No. 7,228,342 entitled "Apparatus and Method for Utilizing an Incentive Point System Based on Disc and User Identification" filed Jun. 28, 2001. The subject matter of the related applications is hereby incorporated by reference.

BACKGROUND OF THE INVENTION

1. Field of the Invention

This invention relates generally to electronic processing systems and more particularly to a disc ownership transfer system utilizing unique disc identification to authorize access to disc storage media.

2. Description of the Background Art

Disc storage media, such as CD-ROM and DVD-ROM storage discs, are typical storage devices for commercially available software programs. For example, publishers and manufacturers of games for electronic gaming systems use read-only storage devices such as CD-ROM discs to distribute and sell their products. Discs may be passed and shared among users; however, there is no effective system in place to account for the potential multiple users of commercially available software products.

Even though discs may be shared without any constraints, it may be that discs are shared only between small groups of users without widespread distribution among the entire user population. The software product is not widely shared, thereby forcing others to purchase their own copy. The software product does not achieve widespread advertising either, limiting the potential for a larger consumer base. For example, the publishers and distributors of game software would like their products advertised to a wide customer base as well as purchased by a wide customer base.

A system that would facilitate an owner of a software product stored on a disc storage medium to sell the disc storage medium to others, is a concern of publishers, distributors, and users of software products. A user may tire of a product on a disc, but instead of storing the disc away, maybe never to be seen again, the user may be offered an opportunity to transfer ownership to another user. Such a system could benefit the publishers and distributors of software products stored on discs by (1) promoting the products and (2) attracting other users who may purchase more products in the future. In addition, such a system could benefit the owner of a software product by providing a method of collecting royalties on the sale of the owner's software product. Finally, such a system could benefit the other potential users of software products by providing a system of purchasing used software programs at less than retail cost.

SUMMARY OF THE INVENTION

An embodiment of the presently claimed invention is for a system for managing transfer of ownership of stored content. The system includes a computing device to transmit an identification of the stored content over a network. A host server receives the identification of the stored content and compares the received identification of the stored content with ownership information. The host server processes a transfer of ownership transaction including permission to access the stored content by a new owner of the stored content.

An embodiment of the presently claimed invention is for a method for managing transfer of ownership of stored content. The method includes the step of receiving an identification of the stored content, the identification having been transmitted over a network. The method further includes comparing the received identification of the stored content with ownership information and processing a transfer of ownership, the transfer of ownership including permission.

A still further embodiment of the presently claimed invention includes a computer-readable storage medium having embodied thereon a program. The program is executable by a processor to perform a method for managing transfer of ownership of stored content. The method includes the step of receiving an identification of the stored content, the identification having been transmitted over a network. The method further includes comparing the received identification of the stored content with ownership information and processing a transfer of ownership, the transfer of ownership including permission.

DETAILED DESCRIPTION

Figure 1:
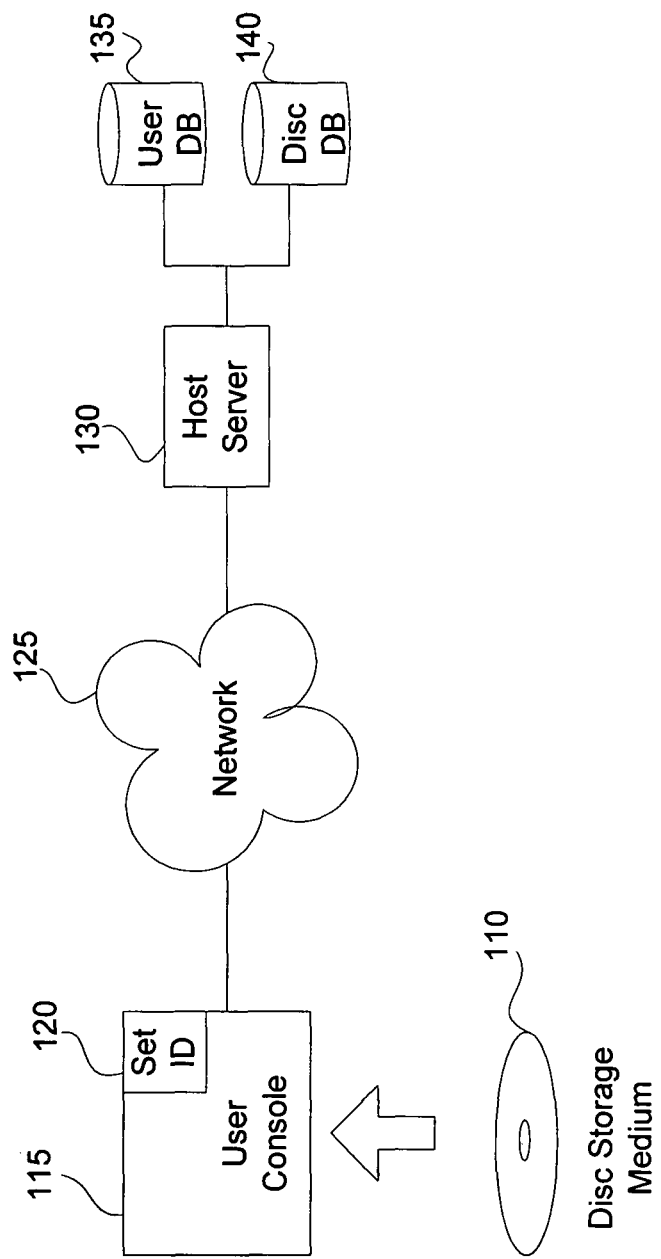
FIG. 1 is a block diagram of one embodiment of an electronic processing system according to the invention.

FIG. 1 is a block diagram of one embodiment of an electronic processing system according to the invention. The processing system includes, but is not limited to, a disc storage medium (disc) 110, a user console 115, a set identification (ID) 120, a network 125, a host server 130, a user database (DB) 135, and a disc database (DB) 140.

The disc 110 is a read-only storage device such as a CD-ROM or a DVD-ROM. As will be discussed further below in conjunction with FIG. 2, a disc identification is stored on the disc 110 to uniquely identify the disc 110.

The user console 115 is an electronic device, such as an electronic gaming system, a general-purpose computer, or a set-top box, that may access the contents of the disc 110. The user console 115 has an interface to the network 125. The network 125 may be a local area network (LAN), a wide area network (WAN), a wireless network, a cable network, or the Internet. The Internet is a broad network of interconnected computers and servers allowing for the transmission and exchange of Internet Protocol (IP) data between users connected to the Internet through a network service provider. Examples of network service providers are the public switched telephone network, a cable service provider, or a satellite service provider.

The user console 115 may be configured to access data from other removable storage media, such as memory cards, floppy discs, or hard disc drives.

During a first use of the user console 115, a user registers the user console 115 with the host server 130. The user console 115 may be registered and identified by either a set ID 120 or a USER ID. The host server 130 stores the set ID 120, the USER ID, or both in the user database 135. As further discussed below in conjunction with FIG. 5, the first time user of the user console 115 will be prompted by the host server 130 to enter user information. This user information will be used to associate a USER ID with a user. In the preferred embodiment of the invention, the USER ID identifies users. However, the set ID 120 may be used instead of the USER ID to identify users.

The host server 130 stores data in the user database 135 and the disc database 140. The databases will be discussed in more detail below in conjunction with FIGS. 3A-3B.

Figure 2:
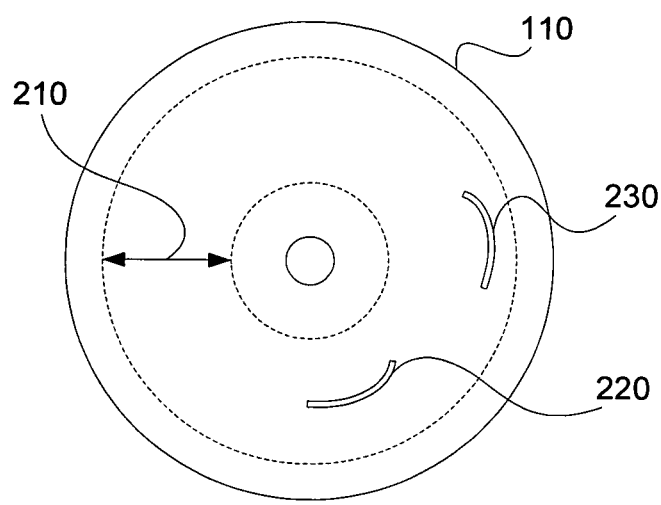
FIG. 2 is a diagram of one embodiment of the disc storage medium of FIG. 1 according to the invention.

FIG. 2 is a diagram of one embodiment of the disc 110 according to the invention. The disc 110 includes, but is not limited to, a data access area 210, a DISC UNIQUE ID address 220, and a DISC UNIQUE ID 230. The disc 110 has a data access area 210 delineated by an inner and outer radius. Data is typically recorded within the data access area 210. The data may include software programs, video data, audio data, or any other type of stored content. Although FIG. 2 shows the DISC UNIQUE ID address 220 and the DISC UNIQUE ID 230 recorded within the data access area 210, either can be recorded outside of the data access area 210.

The DISC UNIQUE ID address 220 contains the disc address of the DISC UNIQUE ID 230. The DISC UNIQUE ID 230 uniquely identifies the disc 110. The contents of the disc 110 cannot be played on the user console 115 or other devices without access permission for the disc 110. Access instructions are sent to the user console 115 from the host server 130 upon receipt of the DISC UNIQUE ID 230 and the USER ID by the host server 130 from the user console 115. Access permission and transfer of disc ownership will be discussed below in conjunction with FIGS. 4-5.

Figure 3:
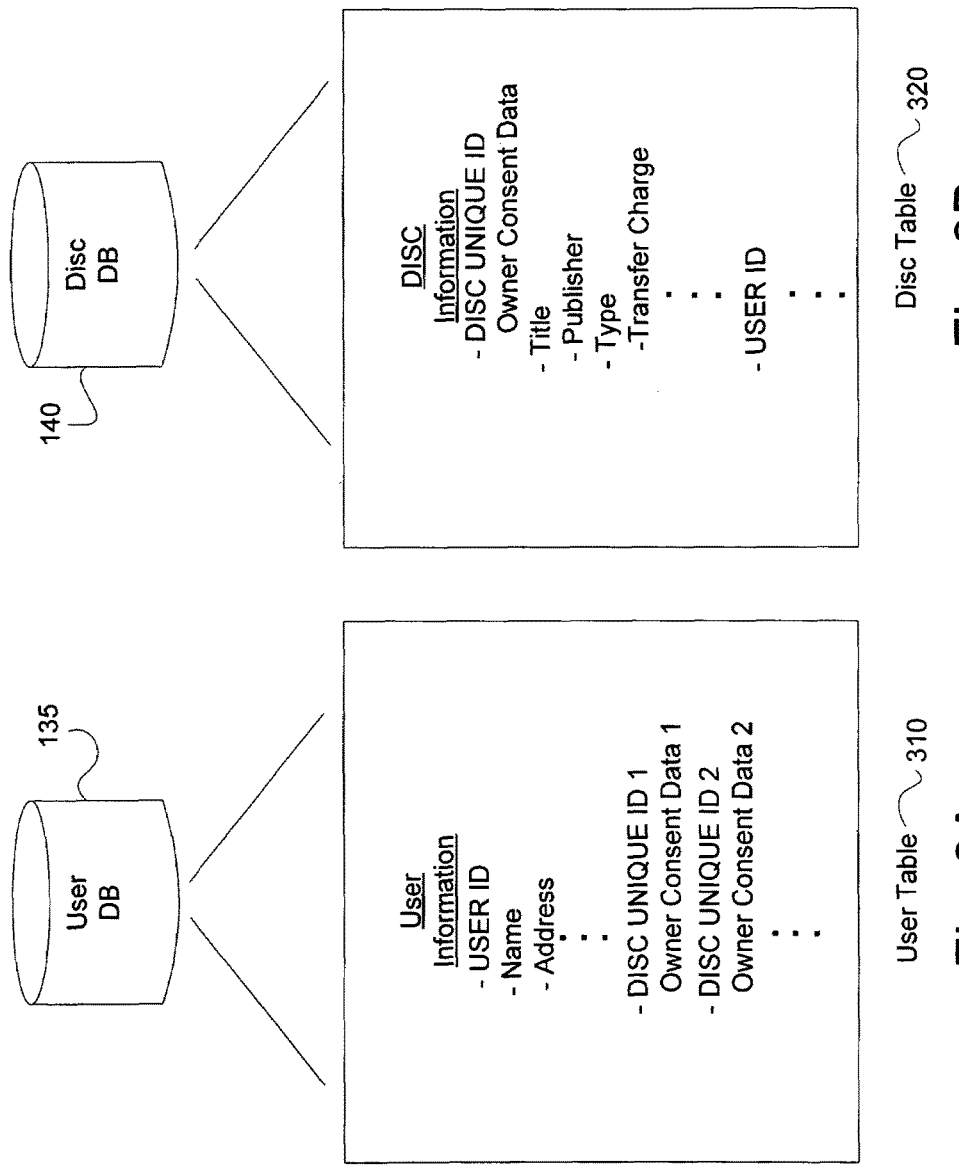
FIG. 3A shows one embodiment of the user database managed by the host server of FIG. 1 according to the invention.
FIG. 3B shows one embodiment of the disc database managed by the host server of FIG. 1 according to the invention.

FIG. 3A shows one embodiment of the user database 135 of FIG. 1 according to the invention. The user database 135 has a user table 310 including user information. User information includes the USER ID and may also include, for example, user name, address, billing information, and user preferences. The user table 310 may also include a plurality of DISC UNIQUE IDs that are associated with each USER ID. Each DISC UNIQUE ID has associated owner consent data. The owner consent data is a data field that contains information regarding the transfer of disc ownership to another user.

FIG. 3B shows one embodiment of the disc database 140 of FIG. 1 according to the invention. The disc database 140 has a disc table 320 including disc information. The disc information includes the DISC UNIQUE ID accompanied by owner consent data and may also include, for example, title, publisher, type, date of purchase, and transfer charge. The disc table 320 may also contain a USER ID associated with each DISC UNIQUE ID. The transfer charge data field includes the payment amount due the user upon transfer of disc ownership to another user.

The transfer charge data field may include other data relevant to charges incurred when ownership of a disc 110 is transferred. For example, a transfer of ownership may also include a royalty payment to the developer of the content of the disc 110, the publisher of the disc 110, or both. A transfer of ownership may also include a royalty payment to a developer of the user console 115. Thus the host server 130 may be further configured to manage other databases that store royalty payment information regarding developers and publishers.

Figure 4:
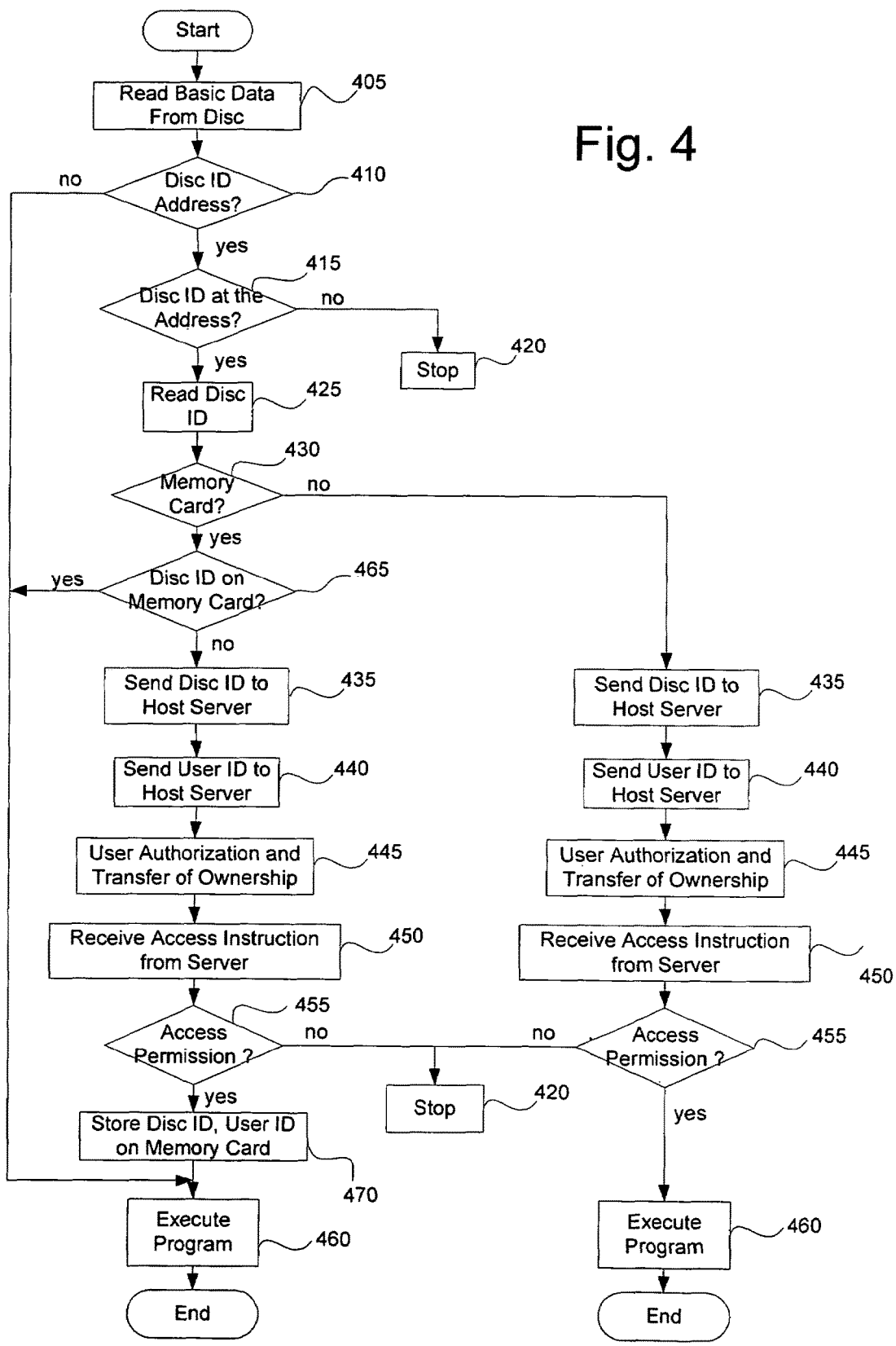
FIG. 4 is a flowchart of method steps for acquiring disc access permission according to one embodiment of the invention.

FIG. 4 is a flowchart of method steps for a user to acquire access permission for a disc 110 on the user console 115, according to one embodiment of the invention. First, in step 405, the user console 115 reads basic data from the disc 110. In step 410, the user console 115 determines if a DISC UNIQUE ID address 220 is stored on the disc 110. If the DISC UNIQUE ID address 220 does not exist, then the method continues with step 460, and the disc program is executed. However, if a DISC UNIQUE ID address 220 does exist, then, in step 415, the user console 115 determines whether a DISC UNIQUE ID 230 is stored at the location given by the DISC UNIQUE ID address 220. If there is no DISC UNIQUE ID 230 recorded, then disc program execution is stopped in step 420. If there is a DISC UNIQUE ID 230 recorded, then, in step 425, the DISC UNIQUE ID 230 is read by the user console 115. In step 430, the user console 115 determines if a memory card is present. The memory card is a removable storage device compatible with the user console 115 or other user consoles that may store data such as USER ID and DISC UNIQUE ID 230.

The FIG. 4 embodiment shows two paths to gain access permission to the disc. If a memory card is not present in user console 115, then the DISC UNIQUE ID 230 and USER ID will be sent to the host server 130 every time the disc 110 is booted. If a memory card is present, then the DISC UNIQUE ID 230 and USER ID is only sent to the host server 130 the first time a user boots the disc 110. When the same user boots the disc 110 on subsequent occasions, host server 130 access is not needed to access the disc 110. Instead of sending the USER ID and DISC UNIQUE ID 230 to the host server 130 for access confirmation, the USER ID and DISC UNIQUE ID 230 stored on the memory card are used to confirm or deny access to disc 110.

In step 430, if the user console 115 determines that a memory card is not present, then, in step 435, the user console 115 sends the DISC UNIQUE ID 230 to the host server 130. In step 440, the USER ID is sent to the host server 130. In step 445, access instructions regarding user authorization are generated and, if appropriate, a transaction of transfer of disc ownership is made and changes in disc ownership are recorded in the appropriate data fields in the user database 135 and disc database 140. The details of step 445 will be discussed in more detail in conjunction with FIG. 5.

In step 450, the user console 115 receives from the host server 130 the access instructions. If access permission is granted, step 455, then disc program execution can commence in step 460. However, if access permission is not granted, disc program execution is stopped in step 420. The details regarding access permission and access denial will be discussed below in conjunction with FIG. 5.

Returning to step 430, if the user console 115 determines that a memory card is present, then, in step 465, the user console 115 determines whether the DISC UNIQUE ID 230 is recorded on the memory card. If the DISC UNIQUE ID 230 is stored on the memory card, then the host server 130 is not contacted and the disc program can be executed in step 460. However, if the user console 115 determines that the DISC UNIQUE ID 230 is not stored on the memory card, then in step 435 the user console 115 sends the DISC UNIQUE ID 230 to the host server 130. In step 440, the user console 115 sends the USER ID to the host server 130. In step 445, access instructions regarding user authorization are generated and, if appropriate, a transaction of transfer of disc ownership is made and changes in disc ownership are recorded in the appropriate data fields in the user database 135 and disc database 140. In step 450, the user console 115 receives access instructions from the host server 130. In step 455, if access permission is granted, then, in step 470, the DISC UNIQUE ID 230 and USER ID are stored on the memory card and, in step 460, the disc program is executed. Consequently, the next time the user boots up the disc 110 with the same memory card installed, the host server 130 does not need to be contacted for access permission.

Figure 5:
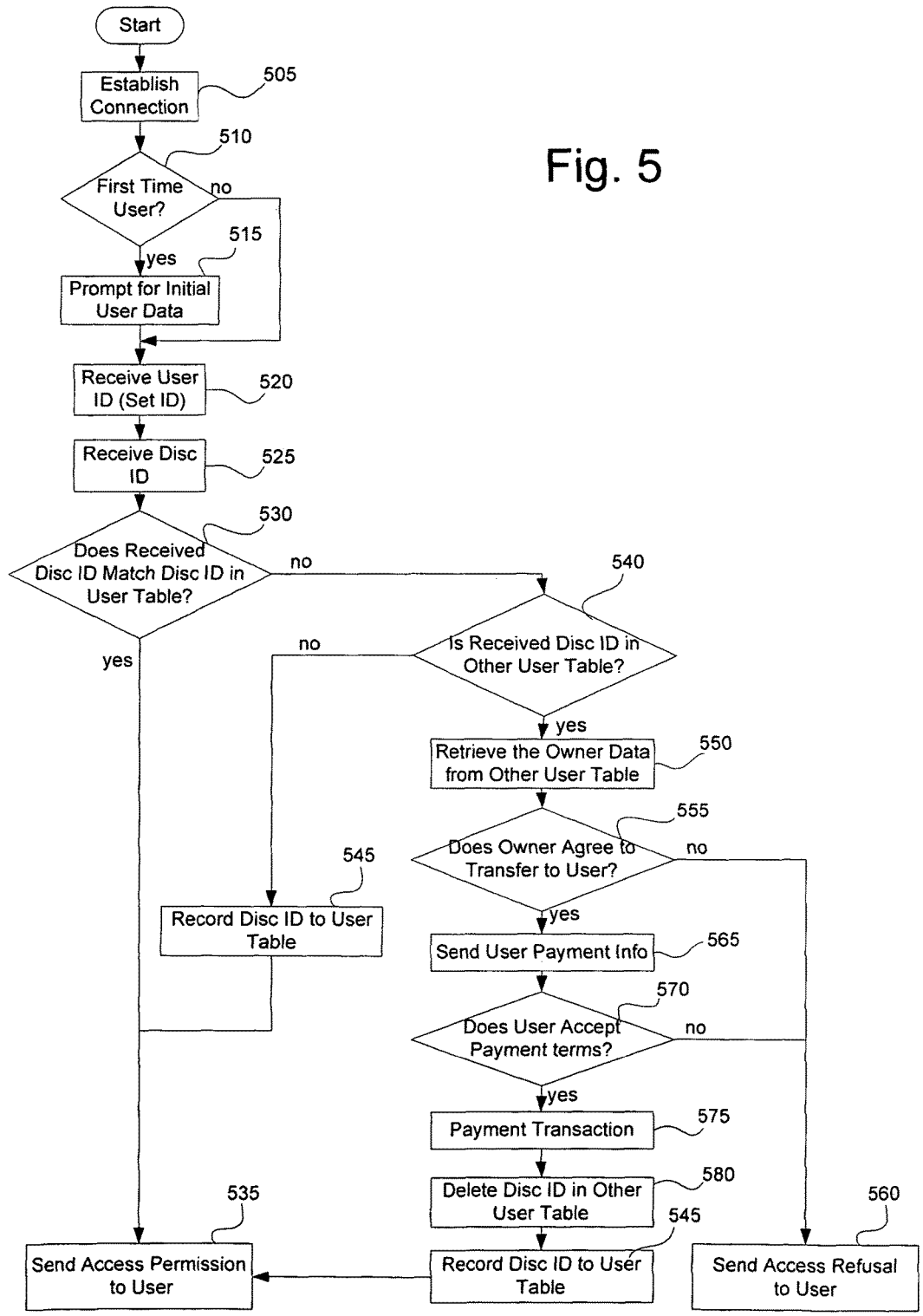
FIG. 5 is a flowchart of method steps for granting disc access permission and transacting a transfer of disc ownership according to one embodiment of the invention.

FIG. 5 is a flowchart of method steps for granting disc access permission and transacting a transfer of disc ownership, according to one embodiment of the invention. First, in step 505, a network connection is established from the user console 115 to the host server 130. Then, in step 510, the host server 130 determines whether the user is a first time user. If the user is a first time user, then, in step 515, the host server 130 prompts the user for initial user data. The user is then assigned a USER ID by host server 130. If the user is not a first time user, then step 515 is skipped. In steps 520 and 525 the host server 130 receives the USER ID (or set ID) and DISC UNIQUE ID 230 from the user console 115, respectively.

In step 530, the host server 130 accesses the user database 135 associated with the USER ID and determines if the received DISC UNIQUE ID 230 matches any of the DISC UNIQUE IDs in the user table 310. If there is a match, then the disc 110 has been previously played by the user. Subsequently, in step 535, access permission is sent to the user console 115.

However, if the received DISC UNIQUE ID 230 does not match any of the DISC UNIQUE IDs in the user table 310 in step 530, then, in step 540, the host server 130 searches for the received DISC UNIQUE ID 230 in other user's user tables. If the host server 130 does not locate a match, then the disc 110 associated with the received DISC UNIQUE ID 230 has been purchased new by the user and never played. Therefore, in step 545, the DISC UNIQUE ID 230 is recorded to the user table 310. The DISC UNIQUE ID 230 may also be recorded to the disc table 320 in the disc database 140. Finally, in step 535, the host server 130 sends access permission to the user console 115.

If, in step 540, the host server 130 does match the received DISC UNIQUE ID 230 to a DISC UNIQUE ID in another user's user table, then another user owns the disc 110. Therefore, in step 550, the host server 130 retrieves the owner data from the other user's user table, including the other user's owner consent data. If the other user has not agreed to transfer disc ownership, then the user is denied access in step 560. However, if the other user has agreed to transfer disc ownership, then, in step 565, the host server 130 sends the user console 115 payment information. If, in step 570, the user decides not to accept payment terms for the transfer of the disc ownership to the user, then the user is refused access in step 560. However, in step 570, if the user decides to accept payment terms for the transfer of the disc ownership to the user, then the host server 130 enables a payment transaction in step 575.

The other user is typically the recipient of the payment; however, the payment transaction may also include a royalty payment or license fee to the developer or publisher of the content on the disc 110. If the disc 110 is a gift from the other user, the payment transaction may only include a royalty payment or license fee.

The payment amount reflects the value of the disc 110, and may be based, for example, on the popularity of the software stored on the disc 110 or the period of time elapsed since the disc 110 was launched. In step 580, the host server 130 deletes the DISC UNIQUE ID in the other user's user table. In step 545, the host server 130 records the DISC UNIQUE ID 230 to the user's user table 310. Finally, in step 535, the host server 130 sends the user console 115 access permission.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:
1. A system for managing transfer of ownership of stored content, the system comprising:
a computing device associated with a first user that:
stores user information regarding content previously accessed by the first user on the computing device,
retrieves content information associated with content stored on a uniquely identified computer-readable storage medium, wherein access permission is required to access the content stored on the uniquely identified computer-readable storage medium,
confirms that the content stored on the uniquely identified computer-readable storage medium is not owned by the first user, wherein the confirmation comprises identifying that the stored user information is not included in the retrieved content information, and
transmits a user access request for the content stored on the uniquely identified computer-readable storage medium, wherein the transmitted user access request includes the user information associated with the first user and the retrieved content information associated with the content stored on the uniquely identified computer-readable storage medium, and wherein the user access request is transmitted to a host server over a network; and a host server that:
searches for ownership information for the content stored on the uniquely identified computer-readable storage medium,
confirms that there is no match between the user information of the first user and the content information associated with the uniquely identified computer-readable storage medium,
searches for ownership information associated with the content stored on the uniquely identified computer-readable storage medium, wherein the ownership information is matched with a second user, the second user being a current owner of the content stored on the uniquely identified computer-readable storage medium, and wherein the ownership information also includes consent information, grants user access to the content stored on the uniquely identified computer-readable storage medium to the first user, wherein the granted access is based on the consent information of the second user, wherein the consent information indicates that the second user has agreed to transfer ownership of the content stored on the uniquely identified computer-readable storage medium, and wherein the transfer of ownership comprising updating the ownership information of the content to indicate that the second user is no longer the owner and that the first user is now the current owner of the content stored on the uniquely identified computer-readable storage medium, and sends access permission to the computing device associated with the first user that allows the first user to access the content stored on the uniquely identified computer-readable storage medium.

2. The system of claim 1, wherein the transfer of ownership requires a payment transaction between the first user and the second user.

3. The system of claim 1, wherein the subsequent access to the content stored on the uniquely identified computer-readable storage medium is allowed based on the updated user identification information, and wherein the subsequent access does not require further access permission from the host server.

4. The system of claim 2, wherein the payment transaction is a payment to the second user identified as the owner of the content stored on the uniquely identified computer-readable storage medium.

5. The system of claim 2, wherein the payment transaction is a royalty payment to a publisher of the content stored on the uniquely identified computer-readable storage medium.

6. The system of claim 1, further comprising a database that stores ownership information of the content stored on the uniquely identified computer-readable storage medium.

7. The system of claim 1, further comprising a database that stores the content information for the content stored on the uniquely identified computer-readable storage media.

8. The system of claim 2, wherein the host server sends the first user terms of the payment transaction and processes the transfer of ownership when the first user agrees to the terms of the payment transaction.

9. The system of claim 8, wherein the host server does not process the transfer of ownership until the first user agrees to the terms of the payment transaction.

10. The system of claim 1, wherein the uniquely identified computer-readable storage medium is a disc.

11. The system of claim 1, wherein the content information associated with the content stored on the uniquely identified computer-readable storage medium includes a disc identification.

12. A method for managing transfer of ownership of content stored on a uniquely identified computer-readable storage media, the method comprising:

receiving a user request for the content stored on a uniquely identified computer-readable storage medium, wherein the received user access request includes a user identification associated with a first user and information associated with the content stored on the uniquely identified computer-readable storage medium at a server, the user identification and content information having been transmitted over a network from a client associated with the first user, wherein the client device:
stores user information regarding content previously accessed by the first user on the client device,
retrieves the content information associated with content stored on the uniquely identified computer-readable storage medium, wherein access permission is required to access the content stored on the uniquely identified computer-readable storage medium, and
confirms that the content stored on the uniquely identified computer-readable storage medium is not owned by the first user, wherein the confirmation comprises identifying that the stored user information is not included in the retrieved content information; and executing instructions stored in memory, wherein the execution of the instructions by a processor:
searches for ownership information for the content stored on the uniquely identified computer-readable storage medium,
confirms that there is no match between the user information of the first user and the content information associated with the uniquely identified computer-readable storage medium,
searches for ownership information associated with the content stored on the uniquely identified computer-readable storage medium, wherein the ownership information is matched with a second user, the second user being a current owner of the content stored on the uniquely identified computer-readable storage medium, and wherein the ownership information also includes consent information, and
grants user access to the content stored on the uniquely identified computer-readable storage medium to the first user, wherein the granted access is based on the consent information of the second user, wherein the consent information indicates that the second user has agreed to transfer ownership of the content stored on the uniquely identified computer-readable storage medium, and wherein the transfer of ownership comprising updating the ownership information of the content to indicate that the second user is no longer the owner and that the first user is now the current owner of the content stored on the uniquely identified computer-readable storage medium, and
sending access permission to the client device associated with the first user that allows the first user to access the content stored on the uniquely identified computer-readable storage medium.

13. A non-transitory computer-readable storage medium, having embodied thereon a program executable by a processor to perform a method for managing transfer of ownership of content stored on a uniquely identified computer-readable storage media, the method comprising:

receiving a user access request for the content stored on a uniquely identified computer-readable storage medium, wherein the received user access request includes a user identification associated with a first user and information associated with the content stored on the uniquely identified computer-readable storage medium at a server, the user identification and content information having been transmitted over a network from a client device associated with the first user, wherein the client device:
stores user information regarding content previously accessed by the first user on the client device,
retrieves the content information associated with content stored on the uniquely identified computer-readable storage medium, wherein access permission is required to access the content stored on the uniquely identified computer-readable storage medium, and confirms that the content stored on the uniquely identified computer-readable storage medium is not owned by the first user, wherein the confirmation comprises identifying that the stored user information is not included in the retrieved content information;

searching for ownership information for the content stored on the uniquely identified computer-readable storage medium for the received user identification of the first user;

confirming there is no match between the user information of the first user and the content information associated with the uniquely identified computer-readable storage medium;

searching for ownership information associated with the content stored on the uniquely identified computer-readable storage medium, wherein the ownership information is matched with a second user, the second user being a current owner of the content stored on the uniquely identified computer-readable storage medium, and wherein the ownership information also includes consent information;

granting user access to the content stored on the uniquely identified computer-readable storage medium to the first user, wherein the granted access is based on the consent information of the second user, wherein the consent information indicates that the second user has agreed to transfer ownership of the content stored on the uniquely identified computer-readable storage medium, and wherein the transfer of ownership comprising updating the ownership information of the content to indicate that the second user is no longer the owner and that the first user is now the current owner of the content stored on the uniquely identified computer-readable storage medium; and sending access permission to the client device associated with the first user that allows the first user to access the content stored on the uniquely identified computer-readable storage medium.

14. The method of claim 1, wherein the host server further denies access to the content stored on the uniquely identified computer-readable storage medium, wherein the denial of access is based on the consent information of the second user, and wherein the consent information indicates that the second user has not agreed to the transfer of ownership of the content stored on the uniquely identified computer-readable storage medium.

15. A system for managing of ownership of stored content, the system comprising:
 a memory for storing:
  user information regarding content that a user previously accessed via a computing device, wherein each user is identified by a unique user identifier,
  current ownership of content stored in the uniquely identified storage medium, and
  consent data indicating whether the current owner of the content stored in the uniquely identified storage medium has agreed to transfer ownership of the content;
 a communication interface that receives an access request indicating that a requesting user wishes to access content owned by another user, the content being stored on a uniquely identified computer-readable storage medium, wherein the requesting user is identified by the unique user identifier;
 a processor for executing instructions stored in memory, wherein execution of the instructions by the processor:
  retrieves content information associated with the content stored on the uniquely identified computer-readable storage medium, wherein access permission is required to access the content stored on the uniquely identified computer-readable storage medium,
  confirms that the content stored on the uniquely identified computer-readable storage medium is not owned by the requesting user, wherein the confirmation comprises identifying that the user information is not included in the retrieved content information,
  searches for ownership information for the content stored on the uniquely identified computer-readable storage medium, wherein the ownership information is matched with a second user, the second user being a current owner of the content stored on the uniquely identified computer-readable storage medium, and wherein the ownership information also includes consent information,
  grants user access to the content stored on the uniquely identified computer-readable storage medium to the requesting user, wherein the granted access is based on the consent information of the second user that indicates that the second user has agreed to transfer ownership of the content stored on the uniquely identified computer-readable storage medium, wherein the transfer of ownership is contingent on completion of a transaction between the requesting user and the second user, and wherein the transfer of ownership includes updating the ownership information of the content stored on the uniquely identified computer-readable storage medium to indicate that the requesting user is the current owner and that the second user is no longer the owner, and
  sends access permission to the computing device associated with the requesting user that allows the requesting user to access the content stored on the uniquely identified computer-readable storage medium.

16. The system of claim 15, wherein the completed completion of the transaction is a payment transaction between the requesting user and the second user.

* * * * *